United States Patent [19]

Butler et al.

[11] Patent Number: 4,647,974

[45] Date of Patent: Mar. 3, 1987

[54] STATION SIGNATURE SYSTEM

[75] Inventors: Robert J. Butler, Oyster Bay; Ronald G. Schlameuss, Hempstead, both of N.Y.

[73] Assignee: RCA Corporation, Princeton, N.J.

[21] Appl. No.: 722,372

[22] Filed: Apr. 12, 1985

[51] Int. Cl.[4] ............................................ H04N 5/265
[52] U.S. Cl. .................................... 358/185; 358/142; 358/183
[58] Field of Search ................. 358/22, 142, 146, 185, 358/194.1, 183

[56] References Cited

U.S. PATENT DOCUMENTS

| 2,540,144 | 2/1951 | Stern | 358/142 |
| 3,673,320 | 6/1972 | Carnt et al. | 358/21 V |
| 3,838,444 | 9/1974 | Loughlin et al. | 358/142 |
| 3,885,217 | 5/1975 | Cintron | 375/38 |
| 4,051,532 | 9/1977 | Hilbert et al. | 358/142 |
| 4,078,245 | 3/1978 | Johnson et al. | 358/142 |
| 4,230,990 | 10/1980 | Lert, Jr. et al. | 358/142 |
| 4,368,486 | 1/1983 | Degoulet et al. | 358/146 |
| 4,390,901 | 6/1983 | Keiser | 358/142 |

FOREIGN PATENT DOCUMENTS 35436 9/1981 European Pat. Off. ............ 358/142

OTHER PUBLICATIONS

Pages 221-225 of a book entitled Colour Television, by Carnt and Townsend, published by Iliffe Books in 1969.

Primary Examiner—John W. Shepperd
Attorney, Agent, or Firm—E. M. Whitacre; L. C. Edelman; P. M. Emanuel

[57] ABSTRACT

A system for the automatic insertion of auxiliary video information into a television signal received at a local station from a network distribution system is provided which inserts a trigger signal into the television signal before its distributed to the local stations. The trigger signal indicates the desired timing of the insertion of the auxiliary video information. At the local stations, means are provided for generating a television signal including the auxiliary video information synchronously with the received television signal. A switch is responsive to detection of the trigger signal for providing at an output the received television signal including the desired auxiliary video information inserted therein.

14 Claims, 7 Drawing Figures

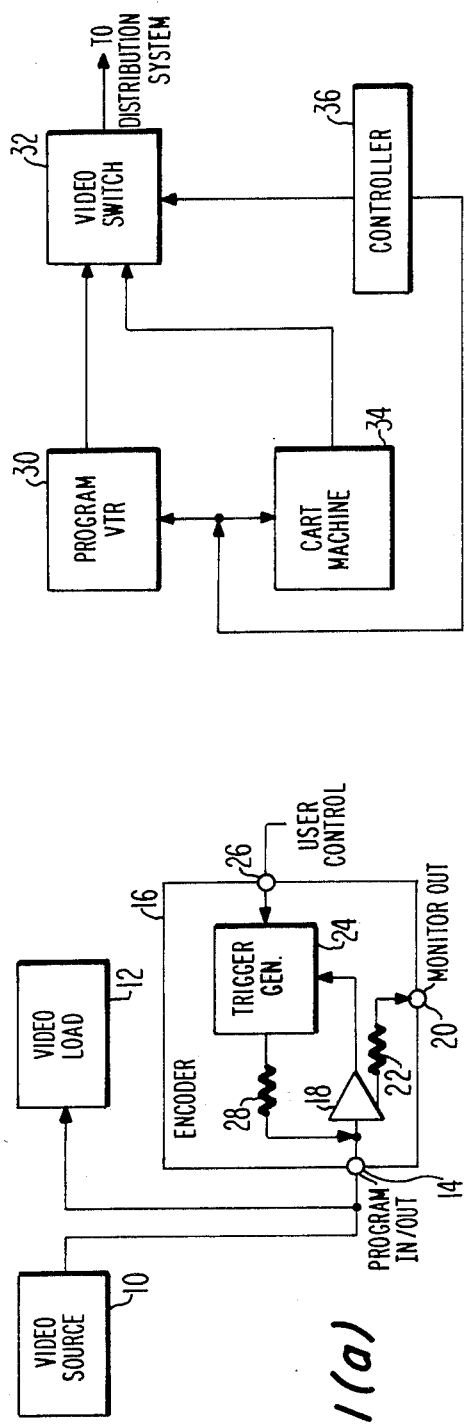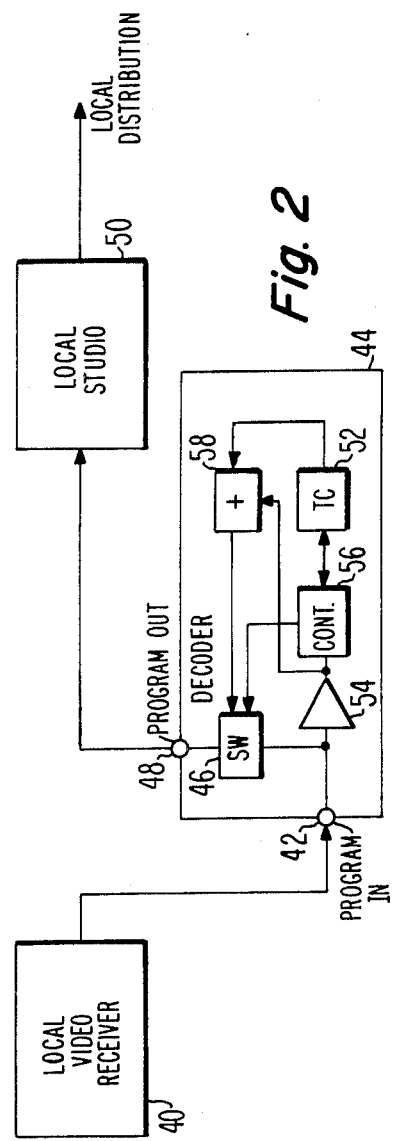

4,647,974

STATION SIGNATURE SYSTEM

FIELD OF THE INVENTION

The present invention relates to a television system which can be used to automatically insert local station information, such as call letters or a logo into network supplied material, such as promotional announcements.

BACKGROUND OF THE INVENTION

It is desirable that local affiliate stations of a television network be able to incorporate their own call letters or logos with network advertisements of upcoming network programming (commonly referred to as "promos") so that television viewers will associate their favorite programs with the local affiliate. Hereinafter this type of function will be called "station signature".

One way of accomplishing station signature would be for the local station to continuously monitor the network promo and switch in a video overlay of his call letters and/or logo at the appropriate time. The video overlay can be generated by a selectively actuated telecine camera or a character generator which is operated synchronously (genlocked) with the program material for switching in the local information. However, this technique is expensive in terms of manpower and equipment, both of which can be put to a more productive use by the local station. Therefore, it would be desirable for station signature to be done automatically.

It is known in the prior art to insert auxiliary signals into the horizontal and/or vertical blanking intervals of a transmitted television signal for transmitting information, such as closed-captioning, teletext, color control signals, etc. However, the inclusion of an auxiliary signal for automatic station signature, which will hereinafter be referred to as a "trigger" signal, in the blanking interval of a television signal is incompatible with present studio tape recording machines. This is so because the studio tape machines used for making a duplicate tape a dub, delete the blanking signals of the source material and insert new blanking signals into the dub. Thus, blanking interval triggers would be removed from the program source material as a result of dubbing and therefore are inappropriate triggers for accomplishing automatic station signature.

Furthermore, it is known for the network to transmit a signal for causing a flashing white box (commonly called a "net cue") to appear within the upper right-hand corner of the active portion of the television picture to indicate a commercial message is about to be sent. The net cue is not visible to television viewers since it is positioned to appear in the raster edge overscan which is conventional in television receivers. At the local stations a monitor, which reproduces the full raster, is used to allow visual detection of the net cue for determining the proper time to initiate insertion of local information. While an electronic detector could be used to sense the white box signal of the net cue for automatically generating a signal to control the insertion of local information, scene content of the program may erroneously cause an indication of the presence of a net cue has been sensed and result in inappropriate operation of the station signature system, thereby jeopardizing the integrity of the television program material. Furthermore, due to last minute scheduling changes that are inherent in network programming (due to, for example, special events such as news bulletins or extra time needed for a sporting event), insertion of the net cue at the network is performed manually and therefore places an extra burden on network personnel and equipment at air time. For this and the other above-noted reasons, a net cue is an inappropriate type of trigger for automatic station signature over prerecorded material.

Thus, it is desirable to provide a station signature system for prerecorded material, i.e., promos, which includes a trigger signal which is not lost if the source material is dubbed and which can be automatically and reliably sensed by monitoring equipment at the local station.

SUMMARY OF THE INVENTION

In accordance with the principles of the present invention, apparatus is provided for inserting a subcarrier signal as a trigger signal in the active picture internal of a television signal for controlling, for example, automatic station signature. In a preferred embodiment, the trigger signal is encoded for providing noise immunity and its frequency is selected to be an odd multiple of one-half the television horizontal line rate in order that it appears 180 degrees out-of-phase in sequential frames. Therefore, the eye of the viewer optically cancels the trigger signal by integration during each two-frame interval, rendering the trigger signal invisible to the television viewer. A decoder situated at each local station monitors the received network supplied program material for detection of the subcarrier trigger. In a preferred embodiment, the decoder at each local station includes a miniature slide chain (telecine camera) which is synchronized by the received network material and activated in response to detection of the trigger signal for automatically inserting local station information into the network material.

BRIEF DESCRIPTION OF THE DRAWINGS

FIGS. 1a and 1b illustrate, in block diagram form, apparatus for the generation and use, respectively, of a prerecorded video tape on which an encoded trigger signal for accomplishing station signature has been recorded in accordance with the invention;

FIG. 2 illustrates, in block diagram form, a local station studio including a decoder constructed in accordance with an aspect of the present invention for receiving program material encoded as shown in FIG. 1a;

FIG. 3 is a more detailed block diagram of the encoder of FIG. 1a;

DETAILED DESCRIPTION OF THE INVENTION

Figure 3:
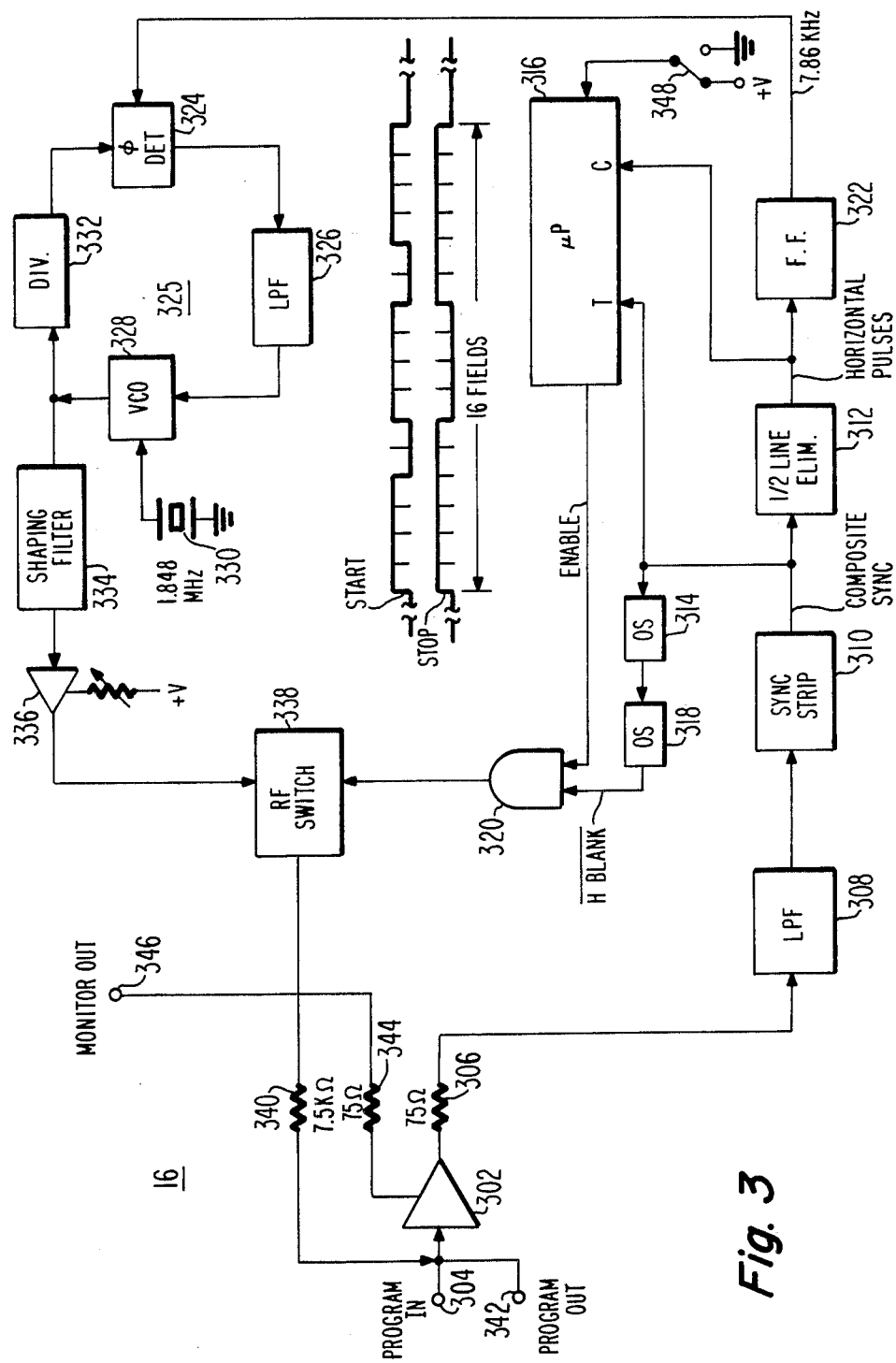

FIGS. 1a, 1b and 2 illustrate the basic elements of the station signature system which allows for the automatic insertion of information such as affiliate station identification call letters and/or a logo (graphics) into a network supplied material such as a promotional announcement.

As shown in FIG. 1a, a network video source 10 which may comprise, for example, a "play" VTR (video tape recorder) or a telecine camera, provides video and audio television program material to a load 12, such as a "record" VTR. The program material is also applied to a program input/output terminal 14 of an encoder 16. Encoder 16 adds an encoded buried (i.e., low level) subcarrier trigger signal to the recorded video signal for later detection by decoder circuitry at the local affiliate stations for controlling the insertion of local information such as station signature graphics.

Briefly, encoder 16 includes a high input impedance distribution amplifier 18 which receives the television program signal at its input from terminal 14 and provides it to a monitor out terminal 20 via a 75 ohm resistor 22 and to a trigger signal generator 24. Generator 24 develops the encoded trigger signal at its output during active field times only, its encoding and timing being controlled by a microprocessor (not shown) responsive to user control signals applied to a user control terminal 26. The output of trigger signal generator 24 is coupled to input/output terminal 14 via a 7.5 K $\Omega$ resistor 28. Since the output impedance of video source 10 is relatively low, i.e., 75 $\Omega$, compared to the relatively high value of resistor 28, the encoded trigger signal is added to the television signal. Trigger generator 24 includes a phase-locked loop (shown in FIG. 3) which is responsive to the composite synchronizing signal of the television signal for generating a phase-locked 1.848 MHz subcarrier signal at $-26$ dB from peak white video as the trigger signal. This frequency is within the video bandwidth of the television signal, but, because its an odd harmonic (the 235th) of one-half the television horizontal line scanning rate it alternates in phase between successive frames and is invisible to television viewers due to the eye's integration of the trigger signal over a two frame period. Since the addition of the trigger signal to the program video is at input/output terminal 14, there is almost no jeopardy to the integrity of the program video in the event of failure of encoder 16.

FIG. 1(b) illustrates apparatus for distributing network television material to local affiliate television stations. A program VTR 30 provides prerecorded network program segments to one input of a video switch 32 and a cart machine 34 selectively provides one of a plurality of prerecorded commercial and/or promotional segments to another input of video switch 32. If the apparatus of FIG. 1a is used for making prerecorded tapes of the promotional segments, the promo tapes include the encoded trigger signal. The output of video switch 32 supplies the network programming including the commercial and/or promotional segments to the local affiliate stations via a cable, satellite or other distribution system. A controller 36 is coupled to synchronously operate both VTR 30 and cart machine 34 and for controlling switch 32 such that the commercial segments and the promo segements having the station signature trigger signal, are provided between sequential program segments.

FIG. 2 illustrates a local affiliate station equipped with a decoder in accordance with an aspect of the present invention for inserting station signature graphics into the received television signal. A local television signal receiver 40, such as a satellite receiver, provides the received signal to a program input terminal 42 of a station signature decoder 44. Decoder 44 includes a switch 46 which is normally in a position to couple the program signal applied to one of its inputs from input terminal 42 to a program output terminal 48 from which it is applied to the remainder of the local affiliate's studio 50. Decoder 44 can be considered as a small insert effects processor including a telecine camera (TC) 52 genlocked to the received television signal for supplying a television signal with inserted station signature graphics to the other input of switch 46. In normal operation, switch 46 couples input terminal 42 to output terminal 48, bypassing the electrical circuit portions of decoder 44. A buffer amplifier 54 provides the television signal from terminal 42 to a controller 56 which detects the encoded trigger signal and controls telecine camera 52 so as to develop a station signature graphics signal which is synchronous with the received television signal. A combiner 58 combines the received television signal with the telecine camera output signal for providing a television signal with inserted station signature graphics to the other input of switch 46. Switch 46 includes a 75 $\Omega$ resistor (not shown) which normally terminates the television signal including station signature graphics. However, in response to detection of the encoded trigger signal, controller 56 controls switch 46 to remove the 75 ohm terminating resistor and to provide to output terminal 48 the television signal including station signature instead of the received television signal. Thus, the television signal including station signature graphics is applied to local studio 50 from which it is locally distributed. Due to the normal position of switch 46 at the input of decoder 44, almost any failure in the decoder circuitry will not jeopardize the integrity of the television signal path from local receiver 40 to the local studio 50.

FIG. 3 illustrates a more detailed block diagram of the encoder of FIG. 1a. The television signal to which the encoded trigger signal is to be added is coupled to the input of a high input impedance distribution amplifier 302 via a program input terminal 304. The output of amplifier 302 is applied via a 75 ohm resistor 306 to a lowpass filter (LPF) 308 having a cutoff frequency of about 150 KHz. The output of LPF 308 is applied to a synchronizing ("sync") signal stripper 310 of conventional design for providing at its output a composite synchronizing signal having horizontal and vertical pulse components. The composite sync signal is applied to a half-line eliminator 312, a one-shot (OS) 314 and a timer (T) input of a microprocessor 316. Half-line eliminator 312 eliminates half-line rate pulses (i.e., the equalizing pulses used for interlace) and may comprise a fifty microsecond OS triggered by horizontal sync pulses for providing a continuous stream of horizontal rate pulses. OS 314 is triggered by the leading edge of each horizontal blanking pulse and provides a delay of approximately 10 microseconds, corresponding to the horizontal blanking interval, before triggering a further OS 308 which provides a $\overline{\text{H BLANK}}$ output pulse. The $\overline{\text{H BLANK}}$ pulse is 52 microseconds wide and corresponds in time to the active portions only of each horizontal line time. The $\overline{\text{H BLANK}}$ pulse is applied as one input to an AND gate 320, the other input of AND gate 320 being an ENABLE signal supplied from microprocessor 316. The horizontal pulses from half-line eliminator 312 are applied to a counter (C) input of microprocessor 316 and to a flip-flop 322 which provides a square wave having a frequency of one-half the line rate (i.e., 7.86 KHz in the NTSC system) to one input of a phase detector 324.

Phase detector 324 is part of a PLL (phase locked loop) 325 for developing a signal at 1.848 MHz which is phase locked to the horizontal sync pulses of the received television signal. This signal will be used as the buried subcarrier trigger signal. PLL 325 includes a LPF 326 for coupling the output of phase detector 324 to the control input of a VCO (voltage controlled oscillator) 328. A crystal 330 is coupled to VCO 328 for establishing a nominal frequency of oscillation at 1.848 MHz. The output of VCO 328 is coupled to a divider 332 which divides the VCO output signal by a factor of 235, for providing a signal at 7.86 KHz to the other input of phase detector 324. Thus, PLL 325 produces a 1.848 MHz VCO output signal (square wave) which is phase locked to the horizontal sync component of the received television signal. The 1.848 MHz signal is then applied via a narrow bandpass shaping filter 334 (for selecting the 1.848 MHZ fundamental frequency component) and a gain-controlled amplifier 336 to a first input of an RF switch 338. Gain-controlled amplifier 336 adjusts the level of the 1.848 mHz signal to 5 IRE peak-to-peak (i.e., −26 dB) for use as the trigger signal.

In response to a control signal from the output of AND gate 320, RF switch 338 selectively passes the 1.848 mHz trigger signal to its output, i.e., it modulates or encodes the trigger signal in an on/off manner. A relatively high impedance (7.5 kΩ) resistor 340, coupled between the output of RF switch 338 and input terminal 304 couples the encoded trigger signal to input terminal 304 where it is added to the input television signal and is available for connection to the remainder of the network processing via an output terminal 342. Additionally, a 75 Ω resistor 344 is coupled from the output of amplifier 302 to a monitor output terminal 346. Amplifier 302 and resistor 344 isolate terminal 346 from any interference at terminal 342. A decoder, such as shown in FIG. 2, can be connected to monitor output terminal 346 for monitoring the operation of the station signature system.

As previously noted, the trigger signal is added to the program material in response to the control signal provided to RF switch 338 from the output of AND gate 320. The ENABLE signal provided by microprocessor 316 to one input of AND gate 320 is normally of a low logic level but exhibits a first unique sequence of high/low logic levels over a 16 television field interval (illustrated as the START waveform) for generating the encoded trigger signal for initiation of station signature and a second unique sequence of high/low logic levels over a 16 television field interval (illustrated as the STOP waveform) for generating the encoded trigger signal for termination of station signature. The 16 field encoding of the trigger signal provides noise immunity, as will be described later on in FIG. 4. Microprocessor 316 is responsive to a negative going edge signal developed by a user control switch 348 for providing the START ENABLE signal and is responsive to a positive going edge signal developed by user control switch 348 for developing the STOP ENABLE signal. User control switch 348 may comprise a push button which is normally in the position shown. For encoding a tape for station signature, the operator depresses control switch 348 at the time when the station signature is to start and releases control switch 348 when it is to stop. For synchronizing the operation of the ENABLE signals with the odd/even field sequence of the program material, microprocessor 316 is also responsive to the composite sync signal at its T input and the horizontal rate pulses provided from half-line eliminator 312 at its C input. A flow chart for the operation of microprocessor 316 is shown in FIG. 5.

Figure 4:
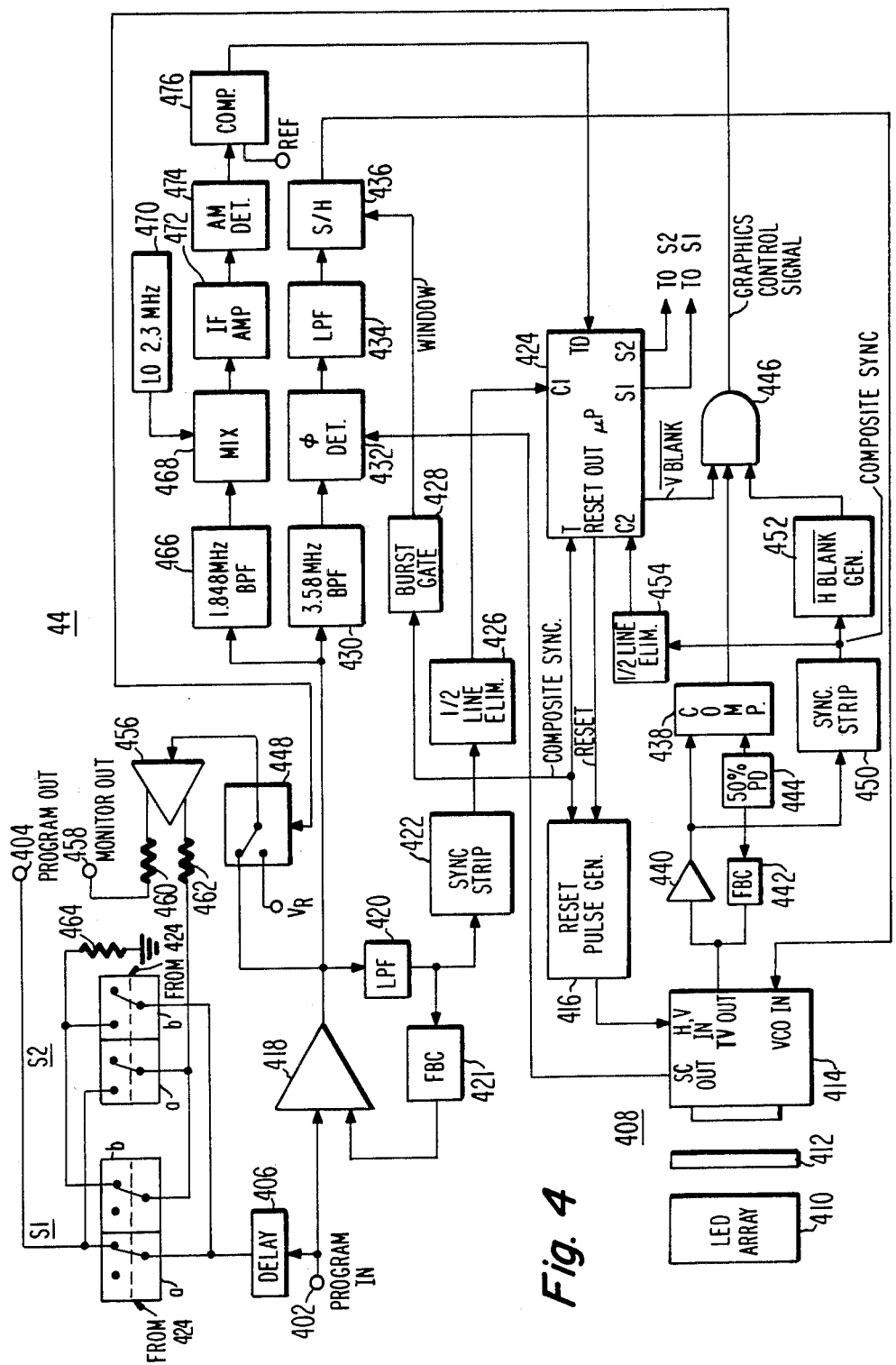
FIG. 4 is a more detailed block diagram of the decoder of FIG. 2.
Figure 5:
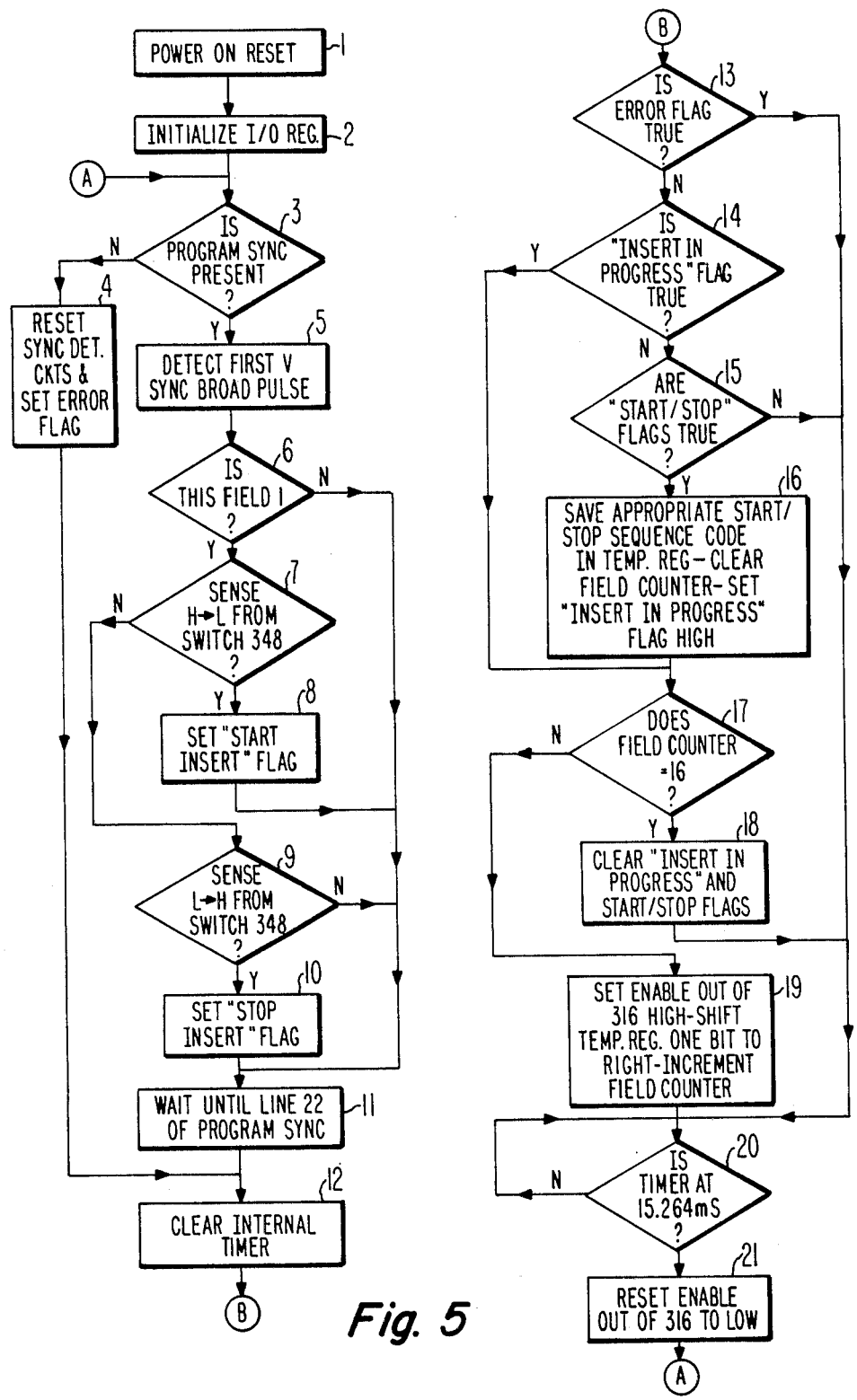
FIG. 5 is a flow chart for the program of a microprocessor used in the encoder of FIG. 3.

FIG. 4 illustrates a more detailed block diagram of the decoder of FIG. 2. A local television receiver such as a satellite receiver (not shown), provides the received television signal to a program in terminal 402 of the station signature decoder. A switch S1a which is normally in the position illustrated, couples the received television signal from input terminal 402 to a program out terminal 404 via a delay 406. Delay 406 provides a signal delay of approximately 14 nanoseconds to compensate for the delay between the received television signal and a locally generated television signal including station signature, which generation will next be described.

The generation of the locally generated station signature television signal begins with a miniature telecine camera system 408, including an LED array 410 as an illuminating light source for a slide 412 including the station signature graphics. A miniature telecine camera 414, such as an all solid state camera including charge coupled device (CCD) imagers, is focused on slide 412, which may comprise a light blocking graphics of the station signature information positioned over a light transmissive background, for providing a television signal including the station signature graphics at its output (TV OUT).

For synchronizing camera 414 with a received television signal, camera 414 includes an input (H,V IN) to which is applied the composite synchronizing signal of the received television signal via a reset pulse generator 416, and includes an internal subcarrier signal generating phase-locked loop (PLL) having an output terminal (SC OUT) and an oscillator control input terminal (VCO IN).

The camera PLL is synchronized to the received television signal as follows. The amplitude level of the received television signal at input terminal 402 is stabilized by a high input impedance amplifier 418 including a LPF 420 and a blanking interval feedback clamp (FBC) 421 of conventional design coupled from its output to a gain controlling input. LPF 420 has an upper cutoff frequency of approximately 150 kHz so as to supply the horizontal (H) and vertical (V) synchronizing signal components to a sync stripper 422, also of conventional design, which provides a composite synchronizing signal at its output. The composite synchronzing signal is applied to reset pulse generator 416, a timer (T) input of a microprocessor 424, a one-half line eliminator 426 and to a burst gate 428. Half line eliminator 426 provides horizontal rate pulses to a first counter (C1) input of microprocessor 424. Eliminator 426 may comprise a 50 microsecond one-shot multivibrator, such as the previously described eliminator 312 of FIG. 3. Burst gate 428 is of conventional design and provides a gate or "window" signal at its output which is coincident with the burst of 3.58 Mhz color subcarrier signal during the back porch of each horizontal blanking pulse of the received television signal.

A narrow bandwidth BPF 430 having a center frequency of 3.58 Mhz is coupled from the output of amplifier 418 to one input of a phase detector 432, the other input of phase detector 432 being from the SC OUT terminal of camera 414. A LPF 434 coupled to the output of phase detector 342 smooths the error signal representing the detected phase difference between the color subcarrier signal of camera 414 and the received television signal color subcarrier burst signal. A sample and hold circuit 436 coupled to the output of LPF 434 is responsive to the window signal from burst gate 428 for sampling and holding the detected phase difference signal and applying it to the VCO IN terminal of camera 414 for completing its color subcarrier PLL. Thus, the station signature graphics television signal provided from camera 414 is completely phase locked to the received television signal.

A pulse signal representative of the station signature graphics television signal is developed at the output of a comparator 438. Comparator 438 receives a level stabilized station signature graphics television signal at one input via an amplifier 440 including a blanking interval feedback clamp 442, and receives at its other input a DC slicing level signal equal to 50% of the peak level of the level stabilized station signature television signal, via a peak detector 444 including a 50% voltage divider at its output. Therefore, on a line-by-line basis, the output of comparator 438 comprises a series of pulses representative of the station signature graphics. This pulse signal is applied to an AND gate 446 which develops at its output a graphics control signal for operating a television signal switch 448. AND gate 446 is also responsive to a $\overline{\text{V BLANK}}$ signal and a $\overline{\text{H BLANK}}$ signal. Switch 448, which normally provides at its output the received television signal from the output of amplifier 418, instead provides at its output a DC level ($V_R$) representative of e.g., a white signal level, in response to each high level pulse of the graphics control signal. Thus, switch 448 provides at its output the received television signal having the desired station signature graphics inserted therein.

The $\overline{\text{V BLANK}}$ signal has a high logic level which is coincident with the active portion of each television line interval and is developed by a sync stripper 450 responsive to the station signature television signal, followed by an $\overline{\text{H BLANK}}$ generator 452. Generator 452 may comprise two series conducted one-shot multivibrators for providing pulses, such as those provided OS 314 and OS 316 of FIG. 3.

The $\overline{\text{V BLANK}}$ signal has a high logic level which is coincident with the television field trace (active) intervals and is developed by microprocessor 424 after confirmation of synchronous H rate pulses at its C1 and C2 inputs. H rate pulses are applied to its C2 input via a half-line eliminator 454 (similar in design to eliminator 426) in response to telecine camera composite sync signal at the output of sync stripper 450.

A distribution amplifier 456 coupled to the output of switch 448 provides the television signal including station signature graphics to a monitor output terminal 458 via a 75 ohm resistor 460 (for monitoring its quality) and to the inputs of switches S1b and S2a via a 75 ohm resistor 462. Switches S1b and S2a are portions of double-pole, double-throw switches S1 and S2 which are controlled by S1 and S2 signals from microprocessor 424 for selectively providing the television signal including station signature graphics at output terminal 404.

As previously noted, switch S1a is normally in the position illustrated for providing the received television signal to program output terminal 404. Switch S1b is normally in the illustrated position for terminating the output of amplifier 456 via a 75 ohm resistor 464. After microprocessor 424 has confirmed that a START encoded trigger signal has been received (the manner of confirmation will be described later), a high logic level signal is provided at its S2 output for switching switch S2 to the position opposite that which is shown. In this position, switch S2a couples the television signal including the station signature graphics to output terminal 404, where it is added to the television signal coupled to that terminal via switch S1a. The level of the television signal provided at output terminal 404 is not doubled, however, since switch S2b couples 75 ohm resistor 464 in parallel with 75 ohm resistor 462 thereby halving the television signal level at output termianl 404. Shortly thereafter, microprocessor 424 provides a high logic level signal at its S1 output which is applied to switch S1 for switching it to a position opposite that which is shown. In this position switches S1a and S1b decouple the received television signal from output terminal 404 (so that only the television signal including station signature graphics is coupled to terminal 404) and remove resistor 464 from its connection to resistor 462, respectively (so that the same signal level is maintained). Thus, when microprocessor 424 confirms that a START encoded trigger signal has been received, switch control signals S1 and S2 are applied for operating switches S1 and S2, respectively, in a time-overlapped manner so as to provide a smooth transition from the received television signal to the television signal including station signature graphics. Conversely, after microprocessor 424 has confirmed that a STOP encoded trigger signal has been received, the S1 and S2 signals are applied to the S1 and S2 switches in a manner opposite that which was previously described for providing a smooth transition from the television signal including station signature graphics back to the received television signal.

Detection of the trigger signal is accomplished using an amplitude modulation (AM) detector. Specifically, a BPF 466 having a narrow bandwidth centered at the 1.848 Mhz trigger frequency is coupled to one input of a mixer 468, the other input being the output of a local oscillator (LO) 470. LO 470 has a frequency of 455 kHz above 1.848 mHz, i.e., 2.3 mHz, in order that a conventional 455 kHz AM IF amplifier 472 and AM detector 474 can be used to detect the presence of the 1.848 mHz trigger signal and provide a high logic level signal to one input of a comparator 476. A DC signal level less than the detected trigger signal output of AM detector 474 is applied to the other input of comparator 476, so as to develop a digital signal at its output which normally is at a low logic level but which switches to a high logic level when the trigger signal is detected. The output of comparator 476 is applied to a trigger detected (TD) input of microprocessor 424.

In response to a high logic level at its TD input, microprocessor 424 initializes an internal counter which counts the horizontal rate pulses at its C input so as to interrogate the TD input four times each field. Interrogation is carried out once during the vertical blanking interval and three times during the vertical trace interval, i.e., near its top, middle and bottom. If in fact the detected 1.848 mHz signal is the encoded trigger signal, microprocessor 424 will sense a low, high, high, high (i.e., a 0111) at its TD input each field. If the trigger signal was encoded to indicate, START of the station signature system, microprocessor 424 will sense the 0111 code for four consecutive fields, a 0000 code for the next two fields, the 0111 code for the next four fields, the 0000 code for the next two fields and the 0111 code for the next four fields, corresponding to the 16 field modulation of the trigger signal caused by the code of the START ENABLE signal provided from microprocessor 316 of FIG. 3. After sensing the above 16 field code, the S1 and S2 outputs of microprocessor 424 control the S1 and S2 switches as previously described for initiating station signature.

In a similar manner, when microprocessor 424 detects levels at its TD input corresponding to six fields of 0111, four fields of 0000 and six fields of 0111, representative of receipt of the STOP encoded trigger signal, its S1 and S2 outputs control the S1 and S2 switches for terminating the station signature AND gate 446 from controlling switch 448. The above 16 field code sequences provide noise immunity to the station signature system be preventing false activation in response to spurious signals.

Additionally, microprocessor 424 also detects the odd/even field sequence of the received television signal in a manner similar to that of microprocessor 316 of FIG. 3, for providing a RESET signal to reset pulse generator 416 in order that the H and V timing signals it provides to telecine camera 414 are locked to the same field sequence as that of the received television signal. Microprocessors 316 and 424 may each comprise, for example, integrated circuit microprocessors such as the 8032 manufactured by Intel Corporation and operates in conjunction with an external read only memory. A flow chart of the operation of microprocessor 424 is shown in FIG. 6.

FIG. 5 is a flow chart for the program of microprocessor 316 of FIG. 3. In steps 1–3 the input and output registers (I/O) of microprocessor 316 are initialized and the presence of synchronization signals at its C input register is confirmed. If there is no confirmation, the registers of microprocessor 316 used for confirming the detection of sync signals are reset and an error flag is set high in step 4, indicating synchronization is not confirmed and to wait until the next field interval. Steps 5 and 6 determine if the input television field is an odd or even field (i.e., field 1 or field 2). This is accomplished by interrogating the T input of microprocessor 316 to detect the first vertical sync broad pulse (which is differentiated from a horizontal sync pulse by its longer duration) and then interrogating the C input to see if a horizontal sync pulse occurs within the next 40 microseconds. If a horizontal sync pulse is detected within 40 microseconds, an odd field is indicated, (i.e., a field 1). Steps 7–10 set either a "start insert" or a "stop insert" flag in response to detection of either a high to a low or a low to a high transition provided from user control 348. In steps 11–16 if there is no error flag or "insert in progress" flag, but there is a "start" or a "stop" flag, the appropriate start or stop sequence code, depending upon whether a low to high or high to low transition was sensed in steps 7 and 9, is stored in a temporary register. The start/stop sequence code corresponds to the sixteen field start or stop code sequences illustrated in FIG. 3 for the ENABLE signal. In step 16, the "insert in progress" flag is set high and if the field counter has not counted sixteen fields since initialization, in step 19 the ENABLE output of microprocessor 316 is set high and the temporary register storing the sequence code is shifted one bit to the right and the contents of the field counter are increased by 1. Step 21 resets the ENABLE output of microprocessor 316 to a low state at the end of the field interval. Then the program returns to the beginning of step 3 and the above described sequence is repeated until the field counter in step 17 is sixteen, causing the "insert in progress" and the "start" or "stop" flags to be cleared in step 18.

Figure 6:
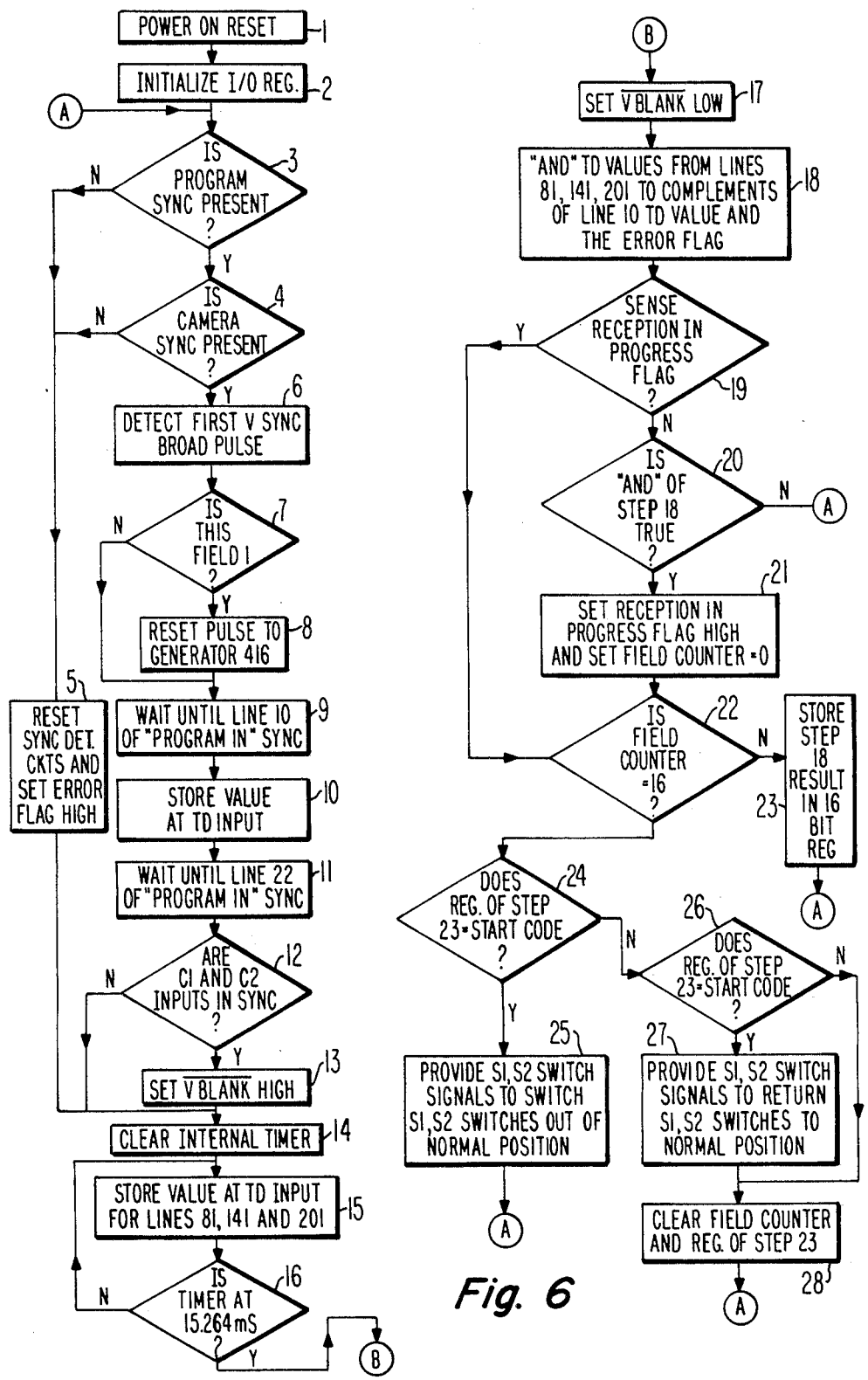
FIG. 6 is a flow chart for the program of a microprocessor used in the decoder of FIG. 4.

FIG. 6 illustrates the flow chart for the program of microprocessor 424 of FIG. 4. In steps 1–5, microprocessor 424 is initialized, its registers used for sync detection are reset and an error flag is set to a high level if "program in" and camera horizontal sync rate pulses are not present at the C1 and C2 inputs, respectively of microprocessor 424. Steps 6–8 determine the field sequence of the "program in" television signal in order to provide a reset pulse to generator 416 for synchronizing the H and V signals provided to camera 414. Field 1 is detected in a manner identical to that previously described with respect to steps 5 and 6 of the flow chart illustrated in FIG. 5. Steps 9 and 10 store the value at the TD input of microprocessor 424 at line 10 of field 1 (which occurs during the vertical blanking interval) for use later on. If horizontal rate signals are being synchronously applied to the C1 and C2 inputs of microprocessor 424 indicating that telecine system 408 is properly synchronized, the V BLANK signal is set high in step 13, allowing the television signal with station signature graphics to appear at monitor output terminal 458. In step 15, in response to control from an internal timer, the values at the TD input are stored for lines 81, 141 and 201, corresponding to the top, middle and bottom of the vertical trace interval, respectively. At the end of field 1, as indicated in step 16, the $\overline{\text{V BLANK}}$ is set low. Confirmation of a trigger signal is determined in step 18 by providing a logical AND function of the TD values stored for lines 81, 141 and 201 with the complement of the TD value stored for line 10 and the complement for the error flag. If TD values of 0111 are sensed at lines 10, 81, 141 and 201 (which as previously noted, corresponds to the expected output of comparator 464 of FIG. 4 upon detection of the trigger signal) and the error flag was not set high (i.e., it is low), the result of the logical AND function will be true (i.e., a high level). In step 21, if the result of step 18 was true, a "reception in progress" flag is set high and a field counter is set to low. The result of step 18 is stored in a 16 bit temporary register and steps 3–23 are repeated until the field counter reaches sixteen. Thereafter, if the code stored in temporary register of step 23 corresponds to the "start" code (four fields high, two fields low, four fields high, two fields low and four fields high) the S1 and S2 switch signals provided from microprocessor 424 operate switches S1 and S2 in the previously described manner for initiating station signature. If, however, the code stored in the temporary register of step 23 corresponds to the "stop" code (six fields high, four fields low and six fields high) then the S1 and S2 switch signals supplied from microprocessor 424 terminate the station signature insertion.

What is claimed is:

1. A system for the automatic insertion of auxiliary video information into a network provided source television signal at a local station, said television signal including video signals representing program information occurring during horizontal trace intervals withing vertical trace intervals, said vertical trace intervals defining active picture intervals and associated vertical blanking intervals defining inactive picture intervals of respective field intervals, comprising:

means for selectively inserting a trigger signal into said active picture intervals of said source television signal by superimposing a carrier signal of a predetermined frequency on said video signals without disturbing said video signals substantially throughout said horizontal trace intervals but only during said vertical trace intervals, said carrier signal being of relatively low amplitude compared to said video signals so as to not produce visible artifacts which interfere with visible images produced in response to said video signals, said trigger signal indicating the desired timing of the insertion of said auxiliary video information;

means for receiving said source television signal including said trigger signal at said local station;

means coupled to said receiving means for providing a signal indicating the presence of said trigger signal in said received television signal, said means for generating said signal indicating the presence of said trigger signal including means for interrogating said received television signal during both of said vertical trace intervals and said vertical blanking intervals and generating said indicating signal if said carrier signal is present during said vertical trace intervals but a signal component having said predetermined frequency of said carrier signal is absent during said vertical blanking intervals;

means coupled to said receiving means for generating an auxiliary video information signal which is synchronous with said received television signal; and switch means having signal inputs coupled to said receiving means and said auxiliary video information signal generating means and a control input coupled to said indicating signal generating means for providing at an output an output television signal including said auxiliary video information in response to said indicating signal.

2. The system of claim 1 wherein said inserting means includes a phase-locked loop responsive to said received television signal for generating a fixed frequency signal as said carrier signal, said fixed frequency being an odd multiple of one-half the frequency of said horizontal trace intervals of said received television signal.

3. The apparatus of claim 2 wherein said inserting means includes summing television signal and said carrier signal; and switch means for selectively providing said carrier signal to said summing amplifier means in response to a switch control signal.

4. The apparatus of claim 3 further including:
control means responsive to a user input control signal for generating an enable signal having a pulse sequence which is applied for encoding said switch control signal.

5. The apparatus of claim 4 wherein said pulse sequence has a rate corresponding to the rate of vertical trace intervals of said source television signal and has a duration of a predetermined number of fields.

6. The apparatus of claim 4 wherein said control means is responsive to said user input control signal for providing a first unique pulse sequence as said enable signal for encoding said switch control signal to indicate initiation of the insertion of said auxiliary video information and a second unique pulse sequence as said enable signal to indicate termination of said insertion.

7. The apparatus of claim 6 further including:
synchronization means responsive to said source television signal for developing horizontal trace representative signals having pulse durations corresponding to said horizontal trace intervals; and
logic means having inputs coupled to receive said enable signal and said horizontal trace representative signals and an output coupled to said switch means for providing said switch control signal thereto.

8. The system of claim 1 wherein said means for generating said auxiliary video information signal synchronously with said source television signal comprises:
means responsive to said received television signal for developing synchronization control signals synchronous with said source television signal; and a telecine camera system responsive to said synchronization control signals for providing at an output said auxiliary video information signal.

9. The system of claim 8 further including:
control means responsive to said synchronous control signals and said indicating signal for providing switch control signals; and
a controlled switch means having inputs responsive to said received television signal and said auxiliary video information signal and responsive to said switch control signals for selectively providing at an output said television signal with said auxiliary video information inserted therein.

10. In a system for the automatic insertion of auxiliary video information into a source television signal including video signals representing program information occurring during line trace intervals within field trace intervals, said field trace intervals defining active picture intervals and associated field blanking intervals defining inactive picture intervals of respective field intervals, said source television signal also including a trigger signal composed of a carrier signal of a predetermined frequency which is selectively superimposed on said video signals without disturbing said video signals substantially throughout said line trace intervals during said active picture intervals only in selected ones of a predetermined number of sequential field trace intervals, said carrier signal having a relatively low amplitude compared with said video signals so as not to be visible in a reproduced picture, said trigger signals controlling the timing of said automatic insertion, apparatus comprising:
detector means responsive to said source television signal for providing an output signal indicating the presence of a signal component having the same frequency as said carrier signal;
synchronization means responsive to said source television signal for generating pulse signals synchronized with said television signal;
control means responsive to said synchronized pulse signals and said presence indicating output signal of said detector means for sampling said source television signal to determine if a signal component having said predetermined frequency is absent or present at least once during each field retrace interval and a plurality of times during the associated field trace interval for developing a code for each field interval, development of a predetermined sequence of different ones of said codes over a number of field intervals corresponding to said predetermined number confirming the presence of said trigger signal;
means responsive to said synchronized pulse signals for generating an auxiliary video information signal synchronized to said source television signal; and
insertion means having inputs coupled to receive said source television signal and said auxiliary video information signal for providing at an output an output television signal with said auxiliary video information inserted therein in response to said trigger signal.

11. The apparatus of claim 10 wherein said means for generating said auxiliary video information signal includes a telecine camera.

12. The apparatus of claim 10 wherein said insertion means includes a first switch having first and second inputs coupled to receive said television signal and a video signal reference level, respectively, and having a control input responsive to said auxiliary video information signal for providing at an output said television signal including said auxiliary video information; and a second switch having signal inputs responsive to said source television signal and said television signal including auxiliary video information provided at the output of said first switch and a control input responsive to said trigger signal.

13. Apparatus according to claim 10 wherein said control means develops a first sequence of codes which confirms detection of said trigger signal encoded to initiate automatic insertion of said auxiliary video information and develops a second code sequence different from said first code sequence which confirms detection of said trigger signal encoded to indicate termination of said automatic insertion.

14. A system for the automatic insertion of auxiliary video information into a source television signal including video signals representative of program information occurring during line trace intervals of field trace intervals defining active portions of said source television signal, said field trace intervals being separated by field retrace intervals defining inactive portions of said television signal, the timing of the insertion of said auxiliary video information into said source television signal being in response to the detection of a trigger signal composed of a carrier signal having a predetermined frequency selectively superimposed on said video signals without disturbing said video signals substantially throughout said line trace intervals but only during said active portions of said television signal and having a relatively low amplitude compared with said video signals so as not to be visible in a reproduced image, comprising:

input means for receiving said source television signal;

synchronization means responsive to said received television signal for providing synchronization control signals;

television signal generator means responsive to said synchronization control signals for providing an auxiliary television signal including said auxiliary video information;

detector means coupled to said received television signal for generating a control signal in response to the detection of the presence of said carrier signal during field trace intervals of said received television signal and the absence of a signal component having said predetermined frequency during said field retrace intervals of said received television signal; and controlled switch means having inputs coupled to receive said received and said auxiliary television signals and a control input responsive to said control signal for selectively providing at an output one of said received and said auxiliary television signals.

* * * * *